March 2, 1971  V. H. AYRE  3,566,693

FLUIDIC ALTITUDE SENSOR

Filed Oct. 3, 1969

Vernon H. Ayre,
INVENTOR

Harry M. Saragovitz
Edward J. Kelly
Herbert Berl
Aubrey J. Dunn

BY

United States Patent Office 3,566,693
Patented Mar. 2, 1971

---

3,566,693
FLUIDIC ALTITUDE SENSOR
Vernon H. Ayre, Falkville, Ala., assignor to the United States of America as represented by the Secretary of the Army
Filed Oct. 3, 1969, Ser. No. 863,637
Int. Cl. G01l 7/00
U.S. Cl. 73—384           4 Claims

ABSTRACT OF THE DISCLOSURE

A fluidic system which has an output related to height above or below a given null altitude is shown. In one embodiment, a fluidic operational amplifier has an input related to the desired null altitude, and further inputs related to static pressure and fixed bias pressure. The inputs are applied through resistors, and feedback is taken through further resistors. Another embodiment is similar to the one described above, but with additional resistors, one inserted between the bias input and its resistor and another between the one resistor and the null input. These resistors compensate for the nonlinear pressure gradient of the earth's atmosphere.

SUMMARY OF THE INVENTION

This invention is a fluidic system for giving an output related to height above or below a given null altitude. In one embodiment, a fluidic operational amplifier has an input related to the desired null altitude, and further inputs related to static pressure and fixed bias pressure. The inputs are applied through resistors, and feedback is taken through further resistors. Another embodiment is similar to the above described embodiment, but with additional resistors, one inserted between the bias input and its resistor and the other between the one resistor and the null input. These resistors compensate for the nonlinear pressure gradient of the earth's atmosphere.

DESCRIPTION OF THE PREFERRED EMBODIMENTS

It should first be made clear what this invention is designed to accomplish. The invention arose from a need in an aircraft of a device to control change from an initial cruising altitude to a new altitude. The new altitude is (for example) 1000 ft. above the initial altitude. The output of the invention may be used as control for an autopilot.

Figure 1:
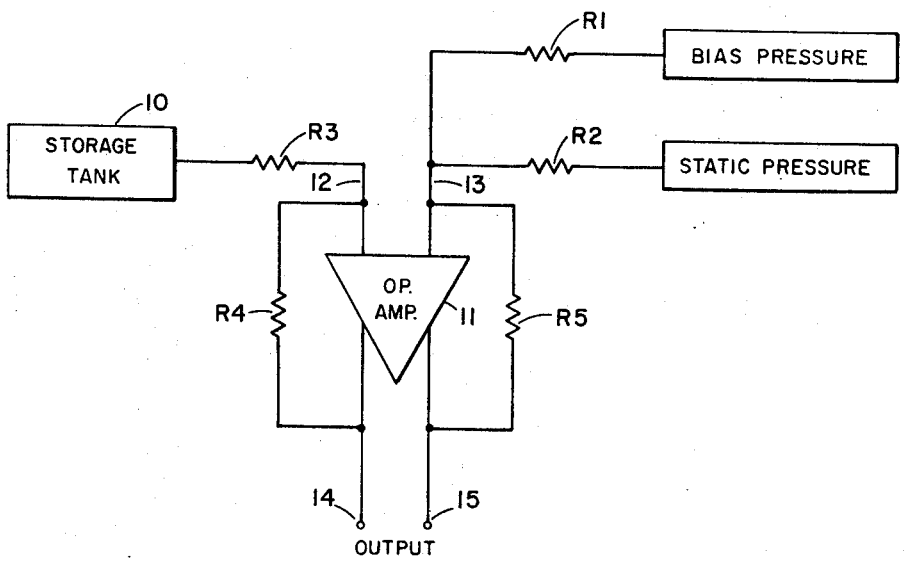
FIG. 1 is a schematic diagram of one embodiment of the invention.

As can be seen in FIG. 1, one embodiment of the invention comprises a storage tank 10 connected through resistor R3 to input 12 of operational amplifier 11. This tank is slowly changed through amplifier 11 and resistor R3. The R-C network formed by the tank and resistor R3 is large enough to allow a leakdown rate of approximately 1% per minute. The tank will change to the initial altitude pressure within a reasonable length of time (20 minutes, for example).

Input 13 of 11 has connected thereto a constant bias pressure (through resistor R1). Static pressure is also applied to input 13, through resistor R2. Output lines 14 and 15 are connected to respective inputs 12 and 13 by respective feedback resistors R4 and R5. The output of operational amplifier 11 may serve as an input to an autopilot, (not shown). The output of 11 will be proportional to the bias pressure when the sensor is at the initial altitude, because initial altitude will equal static pressure. The output will be zero when the outside static pressure plus the fixed bias pressure is equal to the initial altitude pressure.

Figure 2:
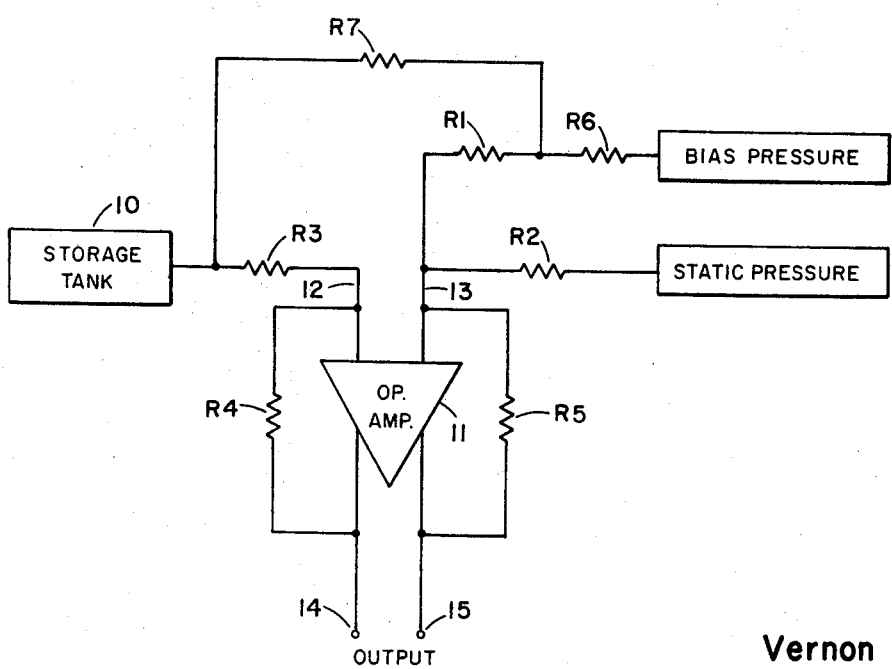
FIG. 2 is a schematic diagram of another embodiment of the invention.

FIG. 2 is similar to FIG. 1, and corresponding elements bear the same reference numerals and/or legends in the two figures. However, FIG. 2 includes additional resistors R6 and R7. As can be seen, R6 is connected between the bias pressure and resistor R1, and R7 is connected between the R1–R6 connection and the connection of tank 10 to resistor R3. Resistors R6 and R7 therefore allow the generation of a bias pressure related to initial altitude.

Typical values of the various resistors of the invention are as follows:

| Resistor: | Value, lb. sec. $\times 10^6$/ft.$^5$ |
|---|---|
| R1 | 100 |
| R2 | 100 |
| R3 | 100 |
| R4 | 100 |
| R5 | 100 |
| R6 | 31.8 |
| R7 | 1 |

It should be understood that these values are merely exemplary for a particular sensor, and in no way are intended to limit the invention.

I claim:
1. A fluidic altitude sensor comprising: a fluidic operational amplifier having input terminals and output terminals, a bias pressure source; a static pressure source; a pressure storage tank; a first resistance means connecting said bias pressure source and said static pressure source to a first input terminal of said amplifier; a second resistance means connecting said tank to a second input terminal of said amplifier; and additional resistance means connecting said output terminals to said first and second input terminals.

2. The invention as set forth in claim 1 wherein said first resistance means includes first and second resistors connected respectively between said bias pressure source and said first input terminal, and said static pressure source and said first input terminal; and said second resistance means includes a third resistor connected between said tank and said second input terminal.

3. The invention as set forth in claim 2 wherein said amplifier has first and second output terminals; with said first and second output terminals connected respectively to said first and second input terminals by respective fourth and fifth resistors.

4. The invention as set forth in claim 3 further including sixth and seventh resistors, said sixth resistor connected between said bias pressure source and said first reistor, and said seventh resistor connected between said sixth resistor and said tank.

References Cited
UNITED STATES PATENTS
3,263,501   8/1966   Bowles _____ 73—384X DONALD O. WOODIEL, Primary Examiner U.S. Cl. X.R.
137—81.5